US006258994B1

(12) United States Patent
Jantzen et al.

(10) Patent No.: US 6,258,994 B1
(45) Date of Patent: Jul. 10, 2001

(54) METHODS OF VITRIFYING WASTE WITH LOW MELTING HIGH LITHIA GLASS COMPOSITIONS

(75) Inventors: Carol M. Jantzen; John B. Pickett; Connie A. Cicero-Herman; James C. Marra, all of Aiken, SC (US)

(73) Assignee: Westinghouse Savannah River Company

( * ) Notice: Subject to any disclaimer, the term of this patent is extended or adjusted under 35 U.S.C. 154(b) by 0 days.

(21) Appl. No.: 09/675,800

(22) Filed: Sep. 28, 2000

Related U.S. Application Data

(62) Division of application No. 09/071,853, filed on May 2, 1998, now Pat. No. 6,145,343.

(51) Int. Cl.[7] .................................................. A62D 3/00
(52) U.S. Cl. .............................................. 588/12; 588/252
(58) Field of Search ................................ 588/11, 12, 252

(56) References Cited

U.S. PATENT DOCUMENTS

| | | | |
|---|---|---|---|
| 2,859,138 | 11/1958 | Blanchard | 117/169 |
| 3,265,627 | 8/1966 | Clark et al. | 252/301.1 |
| 4,020,004 | 4/1977 | Schulz et al. | 252/301.1 |
| 4,097,401 | 6/1978 | Guber et al. | 252/301.1 |
| 4,147,835 | 4/1979 | Nishino et al. | 428/450 |
| 4,376,070 | * 3/1983 | Pope et al. | 588/12 |
| 4,514,329 | 4/1985 | Wakabayashi et al. | 252/629 |
| 4,725,383 | 2/1988 | Hayashi et al. | 252/629 |
| 4,759,879 | 7/1988 | Cadoff et al. | 252/629 |
| 4,772,431 | 9/1988 | Aubert | 252/629 |
| 4,797,232 | 1/1989 | Aubert | 252/629 |
| 4,820,325 | 4/1989 | Wheeler | 65/27 |
| 5,102,439 | 4/1992 | Jantzen | 65/29 |
| 5,273,567 | * 12/1993 | Richards | 65/134.8 |
| 5,292,375 | 3/1994 | Kumar et al. | 134/38 |
| 5,462,570 | * 10/1995 | Balcar et al. | 65/17.1 |
| 5,530,174 | 6/1996 | Kawamura et al. | 588/12 |
| 5,550,310 | * 8/1996 | Richards | 588/11 |
| 5,564,102 | * 10/1996 | Igarashi et al. | 588/11 |
| 5,840,638 | * 11/1998 | Cao et al. | 501/48 |

FOREIGN PATENT DOCUMENTS

| | | |
|---|---|---|
| 25 34 014 | 2/1977 | (DE) . |
| 0 071 927 | 2/1983 | (EP) . |
| 0 287 345 | 10/1988 | (EP) . |
| 2 106 891 | 4/1983 | (GB) . |
| 2 263 478 | 7/1993 | (GB) . |

OTHER PUBLICATIONS

Chemistry of Glass, The American Ceramic Society, Westerville, Ohio, pp. 69–95 (1985).
Hara, M., "Ion–Channel Match in Mixed Alkali Glasses," *J. Non–Cryst. Solids*, vols. 131–133, p. 1076 (1991).
Heidtkamp, V.G., and K. Endell, *Glastechnick Bericht*, 14:3, p. 99 (1936).
Jantzen, C.M. et al., Vitrification of Simulated Fernald K–65 Silo Waste a Low Temperature (U), 100th American Ceramic Society Annual Meeting, Cincinnati, Ohio, May 3–6, 1998.
Jantzen, C.M., "Systems Approach to Nuclear Waste Glass Development," *J. Non–Cryst. Solids*, vol. 84, 215–225, 1986.
Jantzen, C.M., "Vitrification of Simulated Fernald K–65 Silo Waste at Low Temperature," Westinghouse Savannah River Company, WSRC–TR–97–0061, Rev. 0, Jan. 14, 1998.
Kumar, A. et al., "Vitrification of Lead–Based Paint Using Thermal Spray," Ceramic Transactions, vol. 72, pp. 145–155 (1996).
Marra, et al., "Glass Composition Development for a Thermal Spray Vitrification Process," *Ceramic Trans.*, vol. 72, pp. 419–426, Am. Cer. Soc. (1996).
Plodinec, M.J. and J.R. Wiley, "Evaluation of Glass as a Matrix for Solidifying Savannah River Plant Waste: Properties of Glasses Containing $Li_2O$," Issued by E.I. Du Point De Neours & Company, South Carolina, Feb. 1979.
Schott Guide to Glass, Published by Chapman & Hall, London, England, pp. 23–28 (1996).
Taylor, N.W., and Paul S. Dear, "Elastic and Viscous Properties of Several Soda–Silica Glasses in the Annealing Range of Temperature," *J. Amer. Ceram. Soc.*, vol. 20, p. 296 (1937).
Taylor, N.W., and Robert F. Doran, "Elastic and Viscous of Several Potash–Silica Glasses in the Annealing Range of Temperature," *J. Amer. Ceram. Soc.*, vol. 24, p. 103 (1942).

(List continued on next page.)

*Primary Examiner*—Sean Vincent
(74) *Attorney, Agent, or Firm*—Bruce D. Gray, Esq.; Kristen D. Mallatt, Esq.; Kilpatrick Stockton LLP

(57) ABSTRACT

The invention relates to methods of vitrifying waste and for lowering the melting point of glass forming systems by including lithia formers in the glass forming composition in significant amounts, typically from about 0.16 wt % to about 11 wt %, based on the total glass forming oxides. The lithia is typically included as a replacement for alkali oxide glass formers that would normally be present in a particular glass forming system. Replacement can occur on a mole percent or weight percent basis, and typically results in a composition wherein lithia forms about 10 wt % to about 100 wt % of the alkali oxide glass formers present in the composition. The present invention also relates to the high lithia glass compositions formed by these methods. The invention is useful for stabilization of numerous types of waste materials, including aqueous waste streams, sludge solids, mixtures of aqueous supernate and sludge solids, combinations of spent filter aids from waste water treatment and waste sludges, supernate alone, incinerator ash, incinerator offgas blowdown, or combinations thereof, geological mine tailings and sludges, asbestos, inorganic filter media, cement waste forms in need of remediation, spent or partially spent ion exchange resins or zeolites, contaminated soils, lead paint, etc. The decrease in melting point achieved by the present invention desirably prevents volatilization of hazardous or radioactive species during vitrification.

39 Claims, No Drawings

OTHER PUBLICATIONS

Wiker, R.M., "Theory and Practice Concerning the Use of Minor Constituents in Glass," *The Glass Industry*, vol. 37, 28 (1956).

Donald, I.W. et al., "Review. The Immobilization of High Level Radioactive Wastes Using Ceramics and Glasses," J. *J. Materials Science*, vol. 32, No. 22 Nov. 15, 1997, p. 37.

Luckscheiter, B., et al., "Development of Glasses for the Vitrification of High Level Liquid Waste (HLLW) in a Joule Heated Ceramic Melter," *Waste Management*, vol. 16, No. 7, Jan. 1, 1006, pp. 571–578.

Ohashi, S. et al., "Effect of MgO and BaO on $Fe^{3+}/Fe^{2+}$ Equilibrium in a Candidate Glass for Immobilization of High Level Nuclear Waste," *Chemical Abstracts*, vol. 128, No. 7, Feb. 16, 1998, Columbus, Ohio, Abstract No. 78595d, p. 878.

Database WPI, Section Ch. Week 199705, Derwent Publications Ltd., London, GB, Class E36, AN 1997–050200 (Russian Publication No. 2 059 579) to Mash Wks Khrunichev, May 10, 1996).

Database WPI, Section Ch. Week 8846, Derwent Publications Ltd., London, GB; Class K07, AN 88–327039 (JP 63 241400 to New ajapan Radio Co. Ltd.) Oct. 1988.

Patent Abstracts of Japan, vol. 006, No. 180 (C–125), Sep. 14, 1982 (JP 57 095848 A to Nippon Sheet Glass Co. Ltd. Jun. 14, 1982).

Patent Abstracts of Japan, vol. 012, No. 297 (C–519) Aug. 12, 1988 (JP 63m 064941 to Nippon Sheet Glass Co. Ltd. Mar. 23, 1988).

Patent Abstracts of Japan, vol. 012, No. 446 (C–546) Nov. 24, 1988 (JP 63 170247 to O'Hara, Inc. Jul. 14, 1988).

\* cited by examiner

METHODS OF VITRIFYING WASTE WITH LOW MELTING HIGH LITHIA GLASS COMPOSITIONS

This application is a divisional of U.S. application Ser. No. 09/071,853, filed May 2, 1998 now U.S. Pat. No. 6,145,343, having the title "Low Melting High Lithia Glass Compositions and Methods."

The United States Government has rights in this invention pursuant to Contract No. DEAC0989SR1 8035 between the U.S. Department of Energy and Westinghouse Savannah River Company.

BACKGROUND OF THE INVENTION

1. Field of the Invention

The present invention relates to glass compositions suitable for use in stabilization of radioactive, hazardous, or mixed waste, having relatively low melting points and relatively high amounts of lithia ($Li_2O$), to methods of making these glass compositions, and to methods for using the compositions to immobilize waste materials.

2. Description of the Related Art

Various hazardous, radioactive, and mixed (both hazardous and radioactive) wastes, including heavy metal wastes such as lead paint and contaminated soils, require stabilization in solid forms that meet regulatory disposal criteria promulgated by government agencies like EPA and NRC. As discussed below, these wastes originate from a variety of sources, and consequently can exist in a variety of forms, including aqueous waste streams, sludge solids, mixtures of aqueous supernate and sludge solids, combinations of spent filter aids from waste water treatment and waste sludges, supernate alone, incinerator ash, incinerator offgas blowdown, or combinations thereof, geological mine tailings and sludges, asbestos, inorganic filter media, cement waste forms in need of remediation, spent or partially spent ion exchange resins or zeolites, contaminated soils, lead paint, etc.

Many industrial processes generate hazardous wastes in the form of aqueous waste streams, sludge solids, aqueous supernate, incinerator ash, incinerator off gas condensate, and so forth. Waste treatment processes may themselves generate secondary hazardous wastes. For example, solids can be filtered from an aqueous waste stream by passing the stream through filter aids, such as perlite (PERFLO) or diatomaceous earth filters. The spent filter medium is impregnated with the materials removed from the waste stream, such as heavy metals and other hazardous or radioactive substances. The spent filtration wastes must themselves be treated and stabilized before disposal. As used herein, the term "hazardous waste" includes wastes containing substances commonly recognized as hazardous, including but not limited to, chemical wastes, radioactive wastes, mixed chemical and radioactive wastes, heavy-metal-containing wastes, and hazardous organics.

Stabilizing hazardous wastes using currently available technology is expensive and requires enormous resources of equipment and personnel. Stabilization processes must be operated within guidelines established under the Resource Conservation and Recovery Act (RCRA), and the stabilized product must meet stringent state and federal standards. In the case of radioactive or mixed wastes, the stabilized wastes must often be stored for long periods of time waiting for decay of the radioactive components before transportation to an approved underground repository. Minimizing the waste volume is important in minimizing storage, transportation, and final disposal costs.

Incinerators are often used to destroy the hazardous constituents of solid and liquid wastes, as well as municipal garbage. Byproducts of incineration include bottom ash, aqueous incinerator offgas condensate (blowdown), or mixtures of ash and offgas condensate, all of which may contain residual hazardous and/or radioactive substances.

Radioactive waste may be further categorized into high level waste (HLW) and low level waste (LLW). High level waste is generally generated by reprocessing of spent nuclear fuel and other irradiated material, weapons production, research and development, etc. High level waste resulting from fuel reprocessing generally is an acidic, highly radioactive, and heat producing liquid that is generally either calcined to a dry, granular solid or neutralized, dehydrated, and stored as a damp salt, sludge, and supernate liquid. Low level waste generally contains more radioactivity than is allowed for municipal disposal, but are not sufficiently radioactive to produce substantial amounts of heat. Low level waste typically includes contaminated soil, clothing, gloves, resins, waste sludges, etc.

Hazardous wastes may be solidified by vitrification (incorporation into a glass matrix) or cementation. In typical cementation processes, cement-forming materials are added to the waste; any water in the waste solution remains in the solidified product. Therefore, the solidified product has a larger volume than the original waste solution. Also, water, including groundwater, can leach compounds out of cement over time and cement is naturally porous, so the cement-stabilized product must be stored in leak-proof containers to prevent leaching.

Glass is the most long-term environmentally acceptable waste form. Glass is stable and extremely durable. Moreover, the hazardous species are chemically bonded in the glass structure, forming a substantially nonleachable composition. A number of vitrification processes for hazardous wastes have been described. Wheeler (U.S. Pat. No. 4,820,325) stabilizes toxic waste using a glass precursor material such as diatomaceous earth mixed with a compatible glass precursor material such as soda ash, lime (CaO) and alumina. The normally leachable toxicant becomes fixed within the glass when the mixture is vitrified. Hayashi, et al. (U.S. Pat. No. 4,725,383) add ZnO, or a mixture of ZnO with $Al_2O_3$ and/or CaO, to a radioactive sodium borate waste solution. The resulting mixture is dehydrated and melted to produce a vitrified solid solution. Schulz, et al. (U.S. Pat. No. 4,020,004) vitrify radioactive ferrocyanide compounds by fusion with sodium carbonate ($Na_2CO_3$) and a mixture of basalt and $B_2O_3$, or silica ($SiO_2$) and lime (CaO).

As discussed above, solidification of these and other wastes by glassification or vitrification is known, and generally involves combining glass forming compounds and/or natural rock, such as basalts or nepheline syenite, with the waste materials, and melting this mixture at temperatures sufficient to vitrify the mixture and immobilize the waste species in the resulting glass. The waste materials become dissolved in the melt and atomically bonded to the glass matrix that forms when the melt is cooled.

However, vitrification processes are not perfect, and problems are sometimes experienced due to the often limited solubility of the waste materials in the melt during glassification and/or due to the volatility of some or all of the waste species at the relatively high temperatures reached during the vitrification. Jantzen, "Systems Approach to Nuclear Waste Glass Development," *J. Non-Cryst. Solids,* 84 (1–3), 215–225, 1986. As a result, a glass forming additive that lowered the melting temperature of the mixture of waste and glass formers, thereby decreasing the amount or likelihood of waste volatilization, would be very desirable. In addition, a glass forming additive that increased the solubility of waste materials in the glass forming mixture, thereby increasing the amount of waste atomically bonded in the glass, increasing the waste loading capacity of the glass, and decreasing the disposal volume, would also be very desirable.

Lithia ($Li_2O$) has been disclosed to accelerate the dissolution of sand grains and increase melt rate. R. M. Wiker, Glass Industry, 37, 28, (1956). Lithia has also been disclosed to have a lower volatility than soda or potash at equal molar concentrations at 1400° C. Volf, *The Chemical Approach to Glass,* 1984. Lithia has been disclosed to increase the viscosity of glass at low temperatures, N. W. Taylor et al., J. Amer. Ceram. Soc., 20, p. 296 (1937) and 24, p. 103 (1942), and to decrease the viscosity of glass at high temperatures, G. Heidtkamp et al., Glastechnick Bericht, 14, p. 99 (1936), as compared to soda ($Na_2O$) and potash ($K_2O$) containing glasses. Lithia is also disclosed to increase the modulus of elasticity in glasses compared to soda and potash. The mobile $Li^+$ ion has also been disclosed to facilitate transmission of electric current, so that glasses containing $Li^+$ melt at a faster rate in Joule heated melters than in gas fired commercial melters. Small amounts of $Li^+$ have been disclosed to improve the electrical resistance during glass melting, decrease glass density (since $Li^+$ is a light atomic weight element), and impart a low coefficient of thermal expansion to the glass. Lithia is used widely in glass ceramics, such as CHEMCOR and CORNINGWARE (Corning). Volf, *The Chemical Approach to Glass,* 1984.

Despite all of this, lithia is not considered to be a conventional glass component, and is used only for highly specialized applications in the commercial glass industry. Lithia is used in amounts in the range of about 0.7 to about 1.5 wt % to improve meltability in sealing glasses, used, e.g., to seal tungsten metal to glass or to seal different types of glass together. Lithia is also used in amounts of about 0.25 wt % to improve meltability in glass for discharge tubes and large mirrors of astronomical telescopes. Volf, *The Chemical Approach to Glass,* 1984.

One of the reasons for the failure of the art to use lithia more extensively in glassmaking is that the production of commercial container glasses, e.g., commercial bottle glass, and the production of commercial window glass typically does not involve the use of glass forming additives to lower the melting temperature of the glass. The melting point of these glasses is not of great concern because there are no hazardous species to volatilize, and they are routinely formulated to melt at temperatures of around 1300° C. to 1400° C. Lithia in particular is typically avoided in the commercial glass industry because it can cause undesirable effects, such as phase separation. Phase separation results from inhomogeneities in the glass which form regions of liquid-liquid immiscibility at higher temperatures that are retained when the glass cools. Phase separation can result in regions that are quite small and dispersed throughout the glass, and phase separated regions can have different optical and durability properties. W. Vogel, *Chemistry of Glass,* pp. 69–95, American Ceramic Society, 1985. These factors can combine to make phase separated container or window glass undesirably opaque. *Schott Guide to Glass.*

In addition, it is often considered undesirable to mix different alkali oxides in commercial glasses due to the "mixed alkali" effect, i.e., a significant reduction in the diffusion coefficient of the original alkali ion due to the presence of the second alkali ion, irrespective of the relative size of the alkali ions. M. Hara, Ion-channel match in mixed alkali glasses, *J. Non-Cryst. Solids,* 131 (1991). This effect can result in abnormal or nonlinear properties as a function of composition for a wide range of properties, including electrical conductivity of the melt, an important parameter in electric or Joule heated melters.

Jantzen, U.S. Pat. No. 5,102,439, disclose a borosilicate waste glass having about 5 wt % $Li_2O$ produced in a melter operating at 1160° C., but does not suggest that the presence of lithia has any appreciable effect on the melting point of the glass. To the contrary, the nonbridging oxygen equations described by Jantzen do not indicate that lithia has any properties that differentiate it from other alkali metal oxides.

Lead based paint and other coatings, as discussed above, is a form of hazardous waste subject to EPA control and regulation. Kumar et al., U.S. Pat. No. 5,292,375, disclose a process for removal of lead based paint without generation of airborne particles of hazardous waste, and without the need to control lead-containing water solutions. In the process of Kumar et al., particles of a glass mixture are flame sprayed onto the coated surface to form an overlying layer of glass material. As this layer cools, it spalls and separates from the coated structure, taking at least some of the lead based coating with it. This can be repeated as necessary to remove the lead based coating from the underlying structure. The spalled glass fragments can then be collected, remelted, tested for leachability and other regulatory compliance, and disposed of in a landfill. In general, the glass fragments obtained by the Kumar et al. process pass EPA regulations, while the material generated by sandblasting lead based paint will not. The glasses disclosed by Kumar et al. did not contain lithia or ferric oxide, and Kumar et al. make no suggestion to use these compounds. However, it has been disclosed that the spray properties (fluidity) and decreased retention of lead in the structure can be enhanced by the presence of about 2 wt % lithia and about 12.3 wt % ferric oxide. Marra et al., Glass Composition Development for a Thermal Spray Vitrification Process, Ceramic Trans. vol. 72, pp. 419–426, Am. Cer. Soc. (1996).

It is an object of the present invention to provide a method for decreasing the melting point of glass compositions used to immobilize hazardous, radioactive, or mixed waste, so that hazardous or radioactive species are less likely to volatilize during the melting process.

It is another object of the present invention to provide a method for increasing the solubility of hazardous or radioactive species in glass compositions for immobilizing them, and to increase the waste loadings of waste glass immobilization systems.

It is another object of the present invention to provide a process suitable for disposal of radioactive and hazardous waste, such as waste sludges and supernates, spent filter aids, incinerator ash, mixtures of incinerator ash and incinerator blowdown, geological mine tailings, asbestos, loaded ion exchange resins, contaminated soils, and lead based paint and other coatings.

It is another object of the present invention to provide glass compositions that have significantly decreased melting temperatures as compared to those compositions generally used for waste stabilization, including borosilicate glass, soda-lime-silica glass, soda-baria-silica glass, and soda-magnesia-silica glass.

It is another object of the present invention to provide glass compositions whose preparation reduces the occurrence of melter off-gas line pluggage, allows the use of less expensive and more robust melter designs, and provides longer melter design life.

It is another object of the invention to provide waste glass production processes and compositions that lower vitrification temperatures, increase waste loadings, provide for large waste volume reductions, and produce durable glasses suitable for waste stabilization and capable of meeting regulatory guidelines.

SUMMARY OF THE INVENTION

These and other objects and advantages are achieved by the present invention, which is directed to processes for lowering the vitrification temperature of waste glass, to processes for vitrifyng radioactive, hazardous, and mixed wastes using these lowered temperatures, and to glass compositions produced by these processes.

In one sense, the present invention involves the discovery that the addition of lithia or compounds that will form lithia under vitrification conditions, and in particular addition of lithia or lithia formers in place of a portion of soda, or potash, or soda or potash formers, as a glass former and/or fluxing agent will significantly lower the melting point, and hence the vitrification temperature, of waste glass mixtures. Because the glass melter can then be operated at a significantly lower temperature, it is possible to contain more of the hazardous and/or radioactive species in the waste material, rather than volatilizing these species. Addition of lithia or lithia formers also increases solubility of the species in the glass, which enhances the stabilization and retention of the species in the glass after cooling. This effect has been found to be useful in borosilicate glasses, soda-lime-silica glasses, soda-baria-silica glasses, and soda-magnesia-silica glasses, in the presence or absence of substantial amounts of ferric oxide. The lithia may replace all or a portion of the alkali oxide glass formers typically used in these glass forming systems. This replacement may be on a mole percent basis, or on a weight percent basis.

Since clarity of the glass and mixed alkali effects, which are of concern for commercial glasses, are not of concern when stabilizing waste in glass, lithia concentrations of between about 0.16 wt % and 11 wt %, more particularly between about 0.16 wt % and about 9.30 wt %, based upon the total oxide glass formers in the glass composition, are used according to the present invention to lower the melt temperatures of, e.g., sodium borosilicate glasses, soda-lime-silica glasses, soda-baria-silica glasses, and soda-magnesia-silica glasses for a variety of wastes, including wastes found at Savannah River Site, Fernald, Oak Ridge, Rocky Flats, and United States Army facilities. Enhanced stabilization and retention of hazardous, radioactive, and mixed waste, including heavy metals, was achieved by adding lithium compounds as glass formers, usually as $Li_2CO_3$, which converts to $Li_2O$ in the glass when the glass formers and waste are reacted at elevated temperatures.

In one embodiment, the present invention is directed to a method of vitrifying radioactive, hazardous, or mixed waste having the steps of:

(1) mixing said waste with glass formers such that the resulting mixture comprises $SiO_2$ and alkali oxide glass formers, wherein said alkali oxide glass formers comprise lithia formers and other alkali oxide glass formers in amounts such that the lithia formers, calculated as $Li_2O$, are from 11.0 wt % to about 76 wt % of the total alkali oxide glass formers, calculated as $M_2O$, where M is an alkali metal; and (2) melting the resulting mixture at a temperature of between about 1050° C. and about 1250° C. and cooling to form a glass composition. This mixture may be suitable for forming either an alkali oxide borosilicate glass, or an alkali oxide-lime-silica glass. As used herein, the term alkali oxide borosilicate glass, alkali oxide-lime-silica glass, alkali oxide-baria-silica glass, or alkali oxide-magnesia-silica glass denotes a glass composition where the typical alkali oxide, sodium oxide, has been at least partially replaced or has been supplemented by lithia. Alkali oxide borosilicate and soda borosilicate glasses are those having a $B_2O_3$ content as defined in ASTM C162, i.e., 5 wt % or more $B_2O_3$, based upon the total weight of oxide glass formers in the glass composition (and excluding waste components that are not or do not become oxide glass formers during vitrification). The terms "alkali borosilicate," "alkali-lime-silica," "alkali-baria-silica," and "alkali-magnesia-silica" are synonymous with the "alkali oxide" terms described above.

In another embodiment, the present invention is directed to a method of decreasing the melting point of a waste glass that contains sodium oxide, potassium oxide, rubidium oxide, cesium oxide, or combinations thereof and that immobilizes radioactive, hazardous, or mixed waste, having the steps of:

preparing a mixture of waste and glass formers, comprising lithia or a lithia former, selected from the group consisting of Li and lithium compounds that convert to lithia during melting at elevated temperatures, in an amount sufficient to provide between about 0.16 wt % and about 11 wt % $Li_2O$ in the glass composition, based upon the total weight of oxide glass formers in the glass composition; and heating the mixture to a temperature below the melting point of the corresponding mixture without said lithia or lithia former.

In another embodiment, the present invention is directed to an alkali oxide borosilicate glass composition suitable for immobilizing low level radioactive, hazardous, or mixed waste, containing:

(a) $SiO_2$ in an amount ranging from about 35 wt % to about 50 wt %;

(b) $B_2O_3$ in an amount ranging from about 5.0 wt % to about 15 wt %;

(c) $Na_2O$ in an amount ranging from about 9.0 wt % to about 20 wt %; and (d) $Li_2O$ in an amount ranging from about 4.0 wt % to about 10 wt %.

In another embodiment, the present invention is directed to an alkali oxide-lime-silica glass composition suitable for immobilizing radioactive, hazardous, or mixed waste, comprising:

(a) $SiO_2$ in an amount ranging from about 46 wt % to about 66 wt %;

(b) CaO in an amount ranging from about 5 wt % to about 28 wt %;

(c) $Na_2O$ in an amount ranging from about 1.9 wt % to about 25 wt %;

(d) $Li_2O$ in an amount ranging from about 3 wt % to about 11 wt %.

These compositions may contain an amount of $B_2O_3$ ranging from 0 wt % to less than 5 wt %.

In another embodiment, the present invention is directed to an alkali oxide-baria-silica glass composition suitable for immobilizing radioactive, hazardous, or mixed waste, comprising:

(a) $SiO_2$ in an amount ranging from about 48 wt % to about 56 wt %;

(b) BaO in an amount ranging from about 3.5 wt % to about 7.0 wt %;

(c) Na$_2$O in an amount ranging from about 8.0 wt % to about 15 wt %; and (d) Li$_2$O in an amount ranging from about 6.0 wt % to about 10.0 wt %.

These compositions may contain an amount of B$_2$O$_3$ ranging from 0 wt % to less than 5 wt %.

In another embodiment, the present invention is directed to an alkali oxide-magnesia-silica glass composition suitable for immobilizing radioactive, hazardous, or mixed waste, comprising:

(a) SiO$_2$ in an amount ranging from about 40 wt % to about 68 wt %;

(b) MgO in an amount ranging from about 5.0 wt % to about 15 wt %;

(c) Na$_2$O in an amount ranging from about 7.0 wt % to about 20 wt %; and (d) Li$_2$O in an amount ranging from about 3.0 wt % to about 9.0 wt %.

These compositions may contain an amount of B$_2$O$_3$ ranging from 0 wt % to less than 5 wt %.

The present invention can be more clearly understood from the following detailed description of specific embodiments thereof, which are not intended to limit the scope of the appended claims or of equivalents thereto.

DETAILED DESCRIPTION OF SPECIFIC EMBODIMENTS

The advantages of the present invention can typically be accomplished by first determining the composition of the waste to be immobilized, and determining a suitable glass composition for this immobilization, according to techniques known to those of skill in this art. For example, a waste having high levels of calcium compounds like CaCO$_3$ or Ca(OH)$_2$ is typically stabilized using an SLS (soda-lime-silica) composition, since the high levels of calcium compounds present in the waste lead to high levels of lime in the glass, which is inconsistent with soda borosilicate glasses because CaO causes borosilicate glasses to undergo phase separation. Volf, *The Chemical Approach to Glass*, (1984).

Once the waste composition has been determined and a typical glass composition selected, lithia or lithia formers are added to the composition in amounts ranging from 0.16 wt % to about 11 wt %, based on the oxide glass formers in the glass composition. Typically the sodium and/or potassium oxide glass formers necessary to obtain a particular glass composition with a given waste material are at least partially replaced with the lithia or lithia formers. Replacement is typically on a mole percentage basis, but replacement on a weight percentage basis may also be used.

The mixture of waste and added glass formers is then vitrified using standard vitrification techniques, such as Joule melters, that are known in the art. The mixture will melt and vitrify at a temperature below that at which the corresponding glass composition without the lithia or lithia formers will melt or vitrify.

In some of its specific embodiments, the present invention is directed to glass compositions within the ranges indicated below.

(1) An alkali oxide borosilicate glass composition suitable for immobilizing low level radioactive, hazardous, or mixed waste, containing:

(a) SiO$_2$ in an amount ranging from about 35 wt % to about 50 wt %;

(b) B$_2$O$_3$ in an amount ranging from about 5.0 wt % to about 15 wt %;

(c) Na$_2$O in an amount ranging from about 9.0 wt % to about 20 wt %; and (d) Li$_2$O in an amount ranging from about 4.0 wt % to about 10 wt %. This composition may also contain (e) Al$_2$O$_3$ in an amount ranging from about 18 wt % to about 25 wt %; and/or (f) Fe$_2$O$_3$ in an amount ranging from about 1.5 wt % to about 1.9 wt %.

For instance, this composition may more particularly contain, in wt % based on the total oxide glass formers:

SiO$_2$ about 39.9 to about 46.0;

B$_2$O$_3$ about 5.7 to about 9.3;

Na$_2$O about 9.2 to about 9.7; and

Li$_2$O about 4.8 to about 9.3. The composition may further contain

Al$_2$O$_3$ about 19.0 to about 21.3;

Fe$_2$O$_3$ about 1.51 to about 1.86;

CaO about 0.32 to about 0.43;

K$_2$O about 0.98 to about 1.53;

P$_2$O$_5$ about 1.12 to about 2.20; and/or

U$_3$O$_8$ about 0.04 to about 12, more particularly about 4.94 to about 5.25.

(2) An alkali oxide-lime-silica glass composition suitable for immobilizing radioactive, hazardous, or mixed waste, containing:

(a) SiO$_2$ in an amount ranging from about 46 wt % to about 66 wt %;

(b) CaO in an amount ranging from about 5 wt % to about 28 wt %;

(c) Na$_2$O in an amount ranging from about 1.9 wt % to about 25 wt %;

(d) Li$_2$O in an amount ranging from about 3 wt % to about 11 wt %. This composition may further contain:

(e) Al$_2$O$_3$ in an amount ranging from about 2.5 wt % to about 18 wt %;

(f) Fe$_2$O$_3$ in an amount ranging from about 0.9 wt % to about 13 wt %;

(g) K$_2$O in an amount ranging form about 0 wt % to about 1.8 wt %;

(h) P$_2$O$_5$ in an amount ranging from about 0 wt % to about 4.5 wt %; and/or (i) U$_3$O$_8$ in an amount ranging from about 0.5 wt % to about 12 wt %, more particularly about 0.5 wt % to about 5 wt %; or (j) UO$_2$ in an amount ranging from about 0.4 wt % to about 12 wt %, more particularly about 0.4 wt % to about 0.7 wt %.

(3) An alkali oxide-baria-silica glass composition suitable for immobilizing radioactive, hazardous, or mixed waste, containing:

(a) SiO$_2$ in an amount ranging from about 48 wt % to about 56 wt %;

(b) BaO in an amount ranging from about 3.5 wt % to about 7.0 wt %;

(c) Na$_2$O in an amount ranging from about 8.0 wt % to about 15 wt %;

(d) Li$_2$O in an amount ranging from about 6. 0 wt % to about 10.0 wt %. The composition may also contain:

(e) Al$_2$O$_3$ in an amount ranging from about 3.0 wt % to about 5.0 wt %;

(f) PbO in an amount ranging from about 8 wt % to about 12 wt %;

(g) $Fe_2O_3$ in an amount ranging from about 3.0 wt % to about 5.5 wt %;

(h) CaO in an amount ranging from about 1.0 wt % to about 3.0 wt %; and/or (i) $K_2O$ in an amount ranging from about 0.5 wt % to about 1.0 wt %.

(4) An alkali oxide-magnesia-silica glass composition suitable for immobilizing radioactive, hazardous, or mixed waste, containing:

(a) $SiO_2$ in an amount ranging from about 40 wt % to about 68 wt %;

(b) MgO in an amount ranging from about 5.0 wt % to about 15 wt %;

(c) $Na_2O$ in an amount ranging from about 7.0 wt % to about 20 wt %; and (d) $Li_2O$ in an amount ranging from about 3.0 wt % to about 9.0 wt %. The composition may also contain:

(e) $K_2O$ in an amount ranging from about 0.05 wt % to about 0.2 wt %;

(f) $Fe_2O_3$ in an amount ranging from about 8.0 wt % to about 22 wt %;

(g) $Al_2O_3$ in an amount ranging from about 0.1 wt % to about 0.7 wt %; and/or (h) CaO in an amount ranging from about 0.15 wt % to about 0.75 wt %.

EXAMPLES

The present invention has been carried out with a number of different wastes and glass compositions. The addition of lithia or lithia formers to the glass forming mixture causes a significant reduction in the melting temperature while permitting high waste loadings, and without compromising glass durability. These results are obtained in the presence or absence of significant quantities of ferric oxide. The concentrations of $Li_2O$ and $Fe_2O_3$ tested in the various examples is given below.

| Example | Site/Waste | $Li_2O$ (wt %) | $Fe_2O_3$ (wt %) | Max. Temp. Reduction (° C.) |
|---|---|---|---|---|
| 1 | SRS/M-Area | 4.77–9.30 | 1.49–1.86 | 200 |
| 2 | ORR/WETF | 5.91–7.05 | 0.93–1.87 | 177 |
| 3 | ORR/B + C | 3.0–6.0 | 9.38–12.51 | 200 |
| 4 | ORR/CPCF | 3.09–7.23 | 8.31–9.54 | 200 |
| 5 | FEMP/FERNALD | 7.36–8.50 | 4.08–4.43 | 300 |
| 6 | SRS/SOILS | 11 | 0.75–1.21 | 200 |
| 7 | ASBESTOS | 4.0–7.0 | 9.86–19.72 | 300 |
| 8 | LEAD PAINT | 2.0–5.0 | 11.3–12.3 | 350 |

The present invention is suitable for immobilization of a wide range of waste materials, including waste water sludge, spent filter aids, etc. As indicated below, these wastes can be immobilized using either an alkali oxide borosilicate glass or an alkali oxide-lime-silica glass. When an alkali oxide borosilicate glass is used, the waste is typically into a mixture with glass formers such that the mixture contains $B_2O_3$ formers in an efficient to provide 5 wt % $B_2O_3$ or more in the glass composition. Typically, the other alkali oxide glass formers contain $Na_2O$, and the lithia formers are between about 30 wt % and about 50 wt %, more particularly between about 35 wt % and about 50 wt %, even more particularly between about 40 wt % and about 48 wt % of the alkali oxide glass formers. These glass compositions typically have a melting temperature between about 1150° C. and about 1200° C. As indicated above, the present invention is applicable to compositions having amounts of ferric oxide ranging from about 0.75 wt % to about 19.7 wt %, based on the total oxide glass formers in the glass composition, and produces glasses having melting points that are about 170° C. to about 350° C., more particularly about 177° C. to about 350° C., lower than similar glasses without inclusion of lithia or replacement of other alkali oxides, such as sodium oxide, potassium oxide, rubidium oxide, or cesium oxide that might normally be present in the glass composition, with lithia. These borosilicate compositions may also contain $K_2O$ or $Al_2O_3$ or combinations thereof In one embodiment, the invention is directed to borosilicate glass compositions that contain $Li_2O$ in amounts between about 4.8 wt % and about 5.0 wt %, based on the total oxide glass formers. This glass may contain ferric oxide in amounts less than about 2 wt % based on the total oxide glass formers.

When an alkali oxide-lime-silica glass is used, the mixture further contains CaO formers in an amount sufficient to provide between about 0.25 wt % and about 0.5 wt % CaO in the glass composition, but the mixture either does not contain $B_2O_3$ formers, or contains them in amounts that provide less than 5 wt % $B_2O_3$ in the final glass composition. The mixture contains other alkali glass formers such as $Na_2O$, and contains lithia formers in an amount between about 25 wt % and about 35 wt %, more particularly about 30 wt %, of the alkali oxide glass formers. This composition has a melting temperature between about 1150° C. and about 1250° C., more particularly about 1200° C.

Example 1

Wastewater Sludge & Contaminated (Spent) Filter Aid Wastes from the Savannah River Site which are Mixed (Radioactive and Hazardous) Listed Nickel Plating Line Wastes The M-Area operations at the Savannah River Site (SRS) in Aiken, S.C. produced reactor components for nuclear weapons materials for the U.S. Department of Energy. The resulting waste is listed Resource Conservation and Recovery Act (RCRA) F006 waste which is currently undergoing vitrification by DOE vendor, Duratek.

Initial glass formulations were developed by C. M. Jantzen of the Savannah River Technology Center (SRTC) and J. B. Pickett of SRS/M-Area. These glass formulations included significant amounts of $Li_2O$ to lower the melt temperature and allow for maximum i waste loading at 1150° C. Without the addition of $Li_2O$, high waste loadings could both have been achieved with this refractory waste[1] unless the waste/glass additives were processed at 1300–1400° C.

[1] The waste is refractory due to high concentrations of $Al_2O_3$ and $SiO_2$

The M-Area waste is an example of vitrification of a mixture of waste water sludge and contaminated filter aid. The high concentration of spent filter aid in this waste causes the waste mixture to be high in $SiO_2$ and $Al_2O_3$, while the high sludge content causes the waste mixture to be high in $Na_2O$. Because of the high $SiO_2$, $Al_2O_3$, and $Na_2O$ content, vitrification could be realized in either the borosilicate or Soda-Lime-Silica (SLS) glass forming system. Table IA and IB give specific examples of glasses whose melt temperature was lowered by addition of $Li_2O$. Additions of 4.8–5.0 wt % $Li_2O$ to M-Area borosilicate waste glasses caused the melt temperature to be lowered by ~200° C. at 90% waste loading. This can be seen by comparing the composition and melt temperature of MN-7 to MN-10 and MLSi-7 to MLSi-11A in Table IA. The durability of this waste glass, given in Table IA, as the release of U to solution when subjected to EPA Toxic Characteristics Leaching Procedure (TCLP) was not impacted.

Likewise, when ~5 wt % $Li_2O$ was added to Soda-Lime-Silica (SLS) glasses the melt temperature decreased ~200° C. from 1400° to 1200° C. at 90 wt % waste loading. This can be seen by comparing glasses MN-23 to MN-20 and MN-24 or MN-17 to MN-20 in Table IB.

Note that for all the M-Area glasses, $Li_2O$ was substituted for $Na_2O$ on wt % basis. Note that the waste glass compositions in Tables IA and IB contained <2 wt % $Fe_2O_3$ since the M-Area waste did not contain significant amounts of $Fe_2O_3$. These glasses were successfully vitrified in a vendor treatment facility at Savannah River Site, and were provided to the vendor on a confidential basis.

TABLE IA

SRS M-AREA BOROSILICATE GLASSES MADE WITH ACTUAL WASTES[2]

| GLASS OXIDE | MN-7 WT % | MN-10 WT % | MLSi-7 WT % | MLSi-11A WT % |
|---|---|---|---|---|
| $Al_2O_3$ | 21.6 | 19.0 | 24.9 | 21.3 |
| $B_2O_3$ | 5.2 | 5.7 | 5.7 | 9.3 |
| CaO | 0.39 | 0.43 | 0.37 | 0.32 |
| $Cr_2O_3$ | 0.07 | 0.10 | 0.07 | 0.09 |
| $Fe_2O_3$ | 1.71 | 1.86 | 1.49 | 1.51 |
| $K_2O$ | 1.49 | 1.53 | 0.99 | 0.98 |
| $Li_2O$ | 0.00 | 4.80 | 0.00 | 9.80 |
| MgO | 0.26 | 0.27 | 0.24 | 0.21 |
| MnO | 0.03 | 0.04 | 0.03 | 0.03 |
| $Na_2O$ | 14.9 | 9.7 | 17.2 | 9.2 |
| NiO | 0.62 | 0.63 | 0.68 | 0.75 |
| $P_2O_5$ | 2.46 | 2.20 | 1.13 | 1.12 |
| PbO | 0.02 | 0.02 | 0.03 | 0.00 |
| $SiO_2$ | 45.4 | 46.0 | 37.8 | 39.9 |
| $TiO_2$ | 0.09 | 0.08 | 0.08 | 0.07 |
| $U_3O_8$ | 5.00 | 4.94 | 5.45 | 5.25 |
| ZnO | 0.03 | 0.03 | 0.03 | 0.03 |
| $ZrO_2$ | 0.01 | 0.02 | 0.02 | 0.02 |
| OXIDE SUM | 99.28 | 97.35 | 96.21 | 99.51 |
| WASTE LOADING (Wt %) | 90 | 90 | 90 | 80 |
| MELT TEMP (° C.) | 1400 | 1200 | 1400 | 1150 |
| U; TCLP, mg/L | 0.63 | 0.60 | 1.30 | 3.10 |

[2]Waste glass analyses in TABLE IA are as analyzed.

TABLE IB

SRS M-AREA SODA-LIME-SILICA GLASSES MADE WIFH ACTUAL WASTE[3]

| GLASS OXIDE | MN-23 WT % | MN-20 WT % | MN24 WT % | MN-17 WT % | MN-20 WT % |
|---|---|---|---|---|---|
| $Al_2O_3$ | 19.2 | 17.6 | 18.8 | 18.2 | 17.6 |
| $B_2O_3$ | 0.06 | 0.08 | 0.07 | 0.38 | 0.08 |
| CaO | 11.7 | 5.8 | 4.8 | 6.0 | 5.8 |
| $Cr_2O_3$ | 0.09 | 0.08 | 0.08 | 0.07 | 0.08 |
| $Fe_2O_3$ | 1.83 | 1.73 | 1.70 | 1.67 | 1.73 |
| $K_2O$ | 1.44 | 1.58 | 1.42 | 1.54 | 1.58 |
| $Li_2O$ | 0.16 | 4.77 | 0.00 | 0.00 | 4.77 |
| MgO | 0.26 | 0.26 | 0.25 | 0.26 | 0.26 |
| MnO | 0.04 | 0.03 | 0.03 | 0.03 | 0.03 |
| $Na_2O$ | 9.9 | 9.3 | 15.8 | 15.6 | 9.3 |
| NiO | 0.61 | .058 | 0.59 | 0.61 | 0.58 |
| $P_2O_5$ | 2.60 | 2.69 | 2.27 | 2.48 | 2.69 |
| PbO | 0.03 | 0.02 | 0.02 | 0.04 | 0.02 |
| $SiO_2$ | 46.4 | 46.5 | 45.6 | 47.3 | 46.5 |
| $TiO_2$ | 0.07 | 0.07 | 0.07 | 0.08 | 0.07 |
| $U_3O_8$ | 4.91 | 4.90 | 4.91 | 5.14 | 4.90 |
| ZnO | 0.03 | 0.03 | 0.03 | 0.03 | 0.03 |
| $ZrO_2$ | 0.02 | 0.02 | 0.02 | 0.02 | 0.02 |
| OXIDE SUM | 99.35 | 96.03 | 96.42 | 99.41 | 96.03 |
| WASTE LOADING (Wt %) | 90 | 90 | 90 | 90 | 90 |
| MELT TEMP (° C.) | 1400 | 1200 | 1400 | 1350 | 1200 |

[3]Waste glass analyses in TABLE IB are as analyzed.

The present invention is also applicable to waste water sludges having high levels of calcium compounds, such as those resulting from treatment of nitrate containing wastes by biodenitrification, followed by neutralization with lime. As discussed above, because of the high lime levels in the resulting glass, this waste is not particularly suitable for immobilization using alkali oxide borosilicate glass compositions. For this waste, the mixture typically comprises CaO formers in an amount sufficient to provide between about 12 wt % and about 30 wt % CaO in the glass composition, but either does not comprise $B_2O_3$ formers, or comprises $B_2O_3$ formers in amounts that provide less than 5 wt % $B_2O_3$ in the final glass composition. The mixture may contain other alkali glass formers comprise $Na_2O$, and typically contains lithia formers are between about 40 wt % and about 80 wt %, more particularly between about 42 wt % and about 75 wt %, even more particularly between about 42 wt % and about 47 wt % of the alkali oxide glass formers. Glass compositions formed typically have melting temperatures between about 1175° C. and about 1200° C.

Example 2

High CaO Containing Waste Water Treatment Sludge from the Oak Ridge Reservation (ORR) which are Mixed (Radioactive and Hazardous) Listed Wastes The West End Treatment Facility (WETF) wastes at the Y-12 Plant at the Oak Ridge Reservation (ORR) are primarily $CaCO_3$ resulting from treatment of nitrate-containing wastes by biodenitrification followed by neutralization with lime. The WETF sludges are EPA RCRA listed wastes from treatment of solvent residues and nickel plating line waste. The WETF sludges are primarily calcium carbonate, biomass, and iron oxyhydroxide. Depleted uranium is the primary radioisotope of concern in this waste stream, with very low activity contributions from $Tc^{99}$ and transuranic isotopes (Np, etc.). Phenolic compounds represent the principal organic hazardous constituents in the sludge.

Due to the high CaO content ($CaCO_3$ decomposes at the vitrification temperature and becomes atomically bonded in the waste glass as CaO) of this waste sludge, glasses should only be formulated in the SLS system. High CaO is incompatible with borosilicate glass due to the formation of glass-in-glass phase separation which can cause the glass to be inhomogeneous and can compromise the glass durability (the glass quality property of most interest when stabilizing hazardous and radioactive wastes).

For the WETF waste glasses in the SLS glass forming system, the use of 5.91–8.04 wt % $Li_2O$ lowered the melt temperatures from 1366 to 1195° C. at waste loadings varying between 20 and 40 wt % (Table II). Note that $Li_2O$ was substituted for Na2O in WETF 8–1 and 8–3 and 8–7 glasses but substituted for $K_2O$ in WETF 8-J glass on a wt % basis.

Note that the WETF waste glasses are also low in $Fe_2O_3$ (<2 wt %) as are the M-Area glasses in Example I (see Tables IA and IB). However, the waste compositions are extremely different between Example I and Example II.

The $Li_2O$ enhanced glass formulations were successfully vitrified actual WETF waste with $Li_2O$ as a glass forming additive in a pilot scale melter.

Example 3

High CaO Containing Waste Water Treatment Sludge from the Oak Ridge Reservation (ORR) which are Mixed (Radioactive and Hazardous) Listed Nickel Plating Line Wastes Containing High $Fe_2O_3$ The K-1407-B and K-1407-C ponds at the ORR K-25 site (formerly the Oak Ridge Gaseous Diffusion Plant) were used as holding and settling ponds for various waste water treatment streams, originating from coal pile runoff, steam plant boiler blowdown and ash treatment products, raffinate from various U recovery and equipment decontamination operations, plating wastes, purge cascade blowdown, and

TABLE II

OAK RIDGE RESERVATION (ORR) WEST END TREATMENT FACILITY (WETF) GLASSES (8/94)[4]

| GLASS OXIDE | WETF 8-1 Na WT % | WETF 8-1 Li WT % | WETF 8-3 Na WT % | WETF 8-3 Li WT % | WETF 8-7 Na WT % | WETF 8-7 Li WT % | WETF 8-J K WT % | WETF 8-J Li WT % |
|---|---|---|---|---|---|---|---|---|
| $Al_2O_3$ | 5.73 | 5.73 | 4.30 | 4.30 | 2.87 | 2.87 | 5.02 | 5.02 |
| BaO | 0.04 | 0.04 | 0.03 | 0.03 | 0.02 | 0.02 | 0.03 | 0.03 |
| CaO | 27.12 | 27.12 | 20.34 | 20.34 | 13.56 | 13.56 | 23.73 | 23.73 |
| $Cr_2O_3$ | 0.04 | 0.04 | 0.03 | 0.03 | 0.02 | 0.02 | 0.03 | 0.03 |
| CuO | 0.07 | 0.07 | 0.05 | 0.05 | 0.04 | 0.04 | 0.06 | 0.06 |
| $Fe_2O_3$ | 1.87 | 1.87 | 1.40 | 1.40 | 0.93 | 0.93 | 1.63 | 1.63 |
| $K_2O$ | 0.00 | 0.00 | 0.00 | 0.00 | 0.00 | 0.00 | 5.85 | 0.00 |
| $Li_2O$ | 0.07 | 6.07 | 0.05 | 7.05 | 0.04 | 8.04 | 0.06 | 5.91 |
| MgO | 0.99 | 0.99 | 0.74 | .074 | 0.50 | 0.50 | 4.12 | 4.12 |
| $Na_2O$ | 14.21 | 8.21 | 15.66 | 8.66 | 17.10 | 9.10 | 1.98 | 1.98 |
| NiO | 0.09 | 0.09 | 0.07 | 0.07 | 0.04 | 0.04 | 0.08 | 0.08 |
| $P_2O_5$ | 0.56 | 0.56 | 0.42 | 0.42 | 0.28 | 0.28 | 0.49 | 0.49 |
| PbO | 0.03 | 0.03 | 0.02 | 0.02 | 0.01 | 0.01 | 0.02 | 0.02 |
| $SiO_2$ | 48.00 | 48.00 | 56.00 | 56.00 | 64.00 | 64.00 | 55.25 | 55.25 |
| $TiO_2$ | 0.00 | 0.00 | 0.00 | 0.00 | 00.00 | 0.00 | 0.65 | 0.65 |
| $U_3O_8$ | 1.14 | 1.14 | 0.86 | 0.86 | 0.57 | 0.57 | 1.00 | 1.00 |
| ZnO | 0.03 | 0.03 | 0.03 | .003 | 0.02 | 0.02 | 0.03 | 0.03 |
| OXIDE SUM | 100.00 | 100.00 | 100.00 | 100.00 | 100.00 | 100.00 | 100.00 | 100.00 |
| WASTE LOADING (Wt%) | 40 | 40 | 30 | 30 | 20 | 20 | 35 | 35 |
| MELT TEMP (° C.) | 1366 | 1195 | 1366 | 1195 | 1366 | 1195 | 1366 | 1195 |

[4]Waste glass analyses in TABLE II area as targeted not as analyzed.

Other high calcium containing wastes, such as waste pond sludge containing $Ca(OH)_2$, silica, Ag, Ni, depleted U, or Tc99 can also be vitrified using an SLS system. These wastes and the resulting glass compositions may contain significant amounts of ferric oxide or ferric oxide formers. In this case, the mixture further contains CaO formers in an amount sufficient to provide between about 15 wt % and about 22 wt % CaO in the glass composition, and either does not contain $B_2O_3$ formers, or contains them in amounts that provide less than 5 wt % $B_2O_3$ in the final glass composition. The glass mixture can contain other alkali glass formers such as $Na_2O$ formers, and contains lithia formers are between about 37 wt % and about 46 wt % of said alkali oxide glass formers. The mixture can contain iron compounds sufficient to provide about 9.0 wt % to about 13 wt % $Fe_2O_3$, based on the final glass composition. Typically the glass composition has a melting temperature between about 1100° C. and about 1200° C., more particularly about 1150° C.

miscellaneous laboratory wastes and chemicals. The K-1407-B pond was operated as a flow-through settling and holding pond, whereas C pond was operated as a total containment basin, receiving dredged sludge from K-1407-B. Off-gas scrubber blowdown, ion-exchange resin, chlorides and fluorides were added primarily to C pond, Coal pile runoff and fly ash were added primarily to B pond. Stabilization efforts produced about 46,000 drums (89 and 96 gallon capacity) of cemented or partially cemented sludge. Final RCRA clean closure of these ponds entailed dredging up raw sludge (intermixed with dredge clay pond liner) and storing the waste in carbon steel drums. This produced an additional 32,000 drums of raw sludge. The current B/C pond inventory is 7,000,000 gallons (935.000 $ft^3$.)

The B/C Pond sludge wastes are primarily $Ca(OH)_2$ and $SiO_2$. The K-25 Pond sludges are RCRA listed mixed wastes. The primary regulatory metals of concern are Ag and Ni. Depleted uranium (at an average of about 0.30 wt % U-235) is the primary radioisotope of concern in this waste stream, with very low activity contributions from $Tc^{99}$.

The B/C Pond waste is different from the first two examples in the following manner. The $SiO_2$ content of the waste is about the same as in the Example 1 waste but much lower than the $SiO_2$ in the waste in Example 2. At 70–80% waste loading the $SiO_2$ varies from 42–52 wt % in the glass. The B/C Pond waste has high $Fe_2O_3$ content compared to the wastes in Examples I and II. The B/C waste glasses, therefore, have high (~12 wt %) $Fe_2O_3$ (Table III). The effect of $Li_2O$ in the presence of this high $Fe_2O_3$ content is still dramatic in lowering the melt temperatures of the glasses given in Table III by ~200° C. This can be seen by comparing B/C-V27 to V-22, B/C-V28 to V-23, B/C-V29 to V-24. The substitutions of $Li_2O$ for $Na_2O$ on a wt % basis ranged from 3.0–6.0 wt % $Li_2O$(See Table III).

TABLE III

OAK RIDGE RESERVATION (ORR) B/C WASTE GLASSES (1/96)

| GLASS OXIDES | B/C-V27 WT % | B/C-V22 WT % | B/C-V28 WT % | B/C-V23 WT % | B/C-V29 WT % | B/C-V24 WT % |
|---|---|---|---|---|---|---|
| $Al_2O_3$ | 10.18 | 10.18 | 8.91 | 8.91 | 7.64 | 7.64 |
| CaO | 20.62 | 20.62 | 18.05 | 18.05 | 15.47 | 15.47 |
| $Fe_2O_3$ | 12.51 | 12.51 | 10.94 | 10.94 | 9.38 | 9.38 |
| $K_2O$ | 1.72 | 1.72 | 1.50 | 0.00 | 1.29 | 1.29 |
| $Li_2O$ | 3.00 | 0.00 | 4.50 | 0.00 | 6.00 | 0.00 |
| $Na_2O$ | 3.00 | 6.00 | 4.50 | 9.00 | 6.00 | 12.00 |
| NiO | 0.55 | 0.55 | 0.48 | 0.48 | 0.41 | 0.41 |
| $SiO_2$ | 46.92 | 46.92 | 49.81 | 49.81 | 52.69 | 52.69 |
| $TiO_2$ | 0.79 | 0.79 | 0.70 | 0.70 | 0.60 | 0.60 |
| SUM | 99.29 | 99.29 | 99.38 | 99.38 | 99.47 | 99.47 |
| WASTE LOADING (Wt %) | 80 | 80 | 80 | 80 | 70 | 70 |
| MELT TEMP (° C.) | 1150 | 1350 | 1150 | 1350 | 1150 | 1350 |
| Passed TCLP | YES | YES | YES | YES | YES | YES |

The present invention is also useful for treating non-nitrate bearing wastes, such as plating line sludges containing significant quantities of organics, such as concentrated acidic or caustic wastes or oily mopwater containing beryllium, thorium, uranium, emulsified oils, soaps, cleansers, or HF scrubber solutions. The mixtures may contain iron compounds sufficient to provide about 8 wt % to about 10 wt % $Fe_2O_3$, and/or phosphorus compounds sufficient to provide about 3 wt % to about 5 wt % $P_2O_5$, based on the final glass composition. The mixtures used further contain CaO formers in an amount sufficient to provide between about 5 wt % and about 15 wt % CaO, more particularly between about 10 wt % and about 13 wt % in the glass composition, and either do not contain $B_2O_3$ formers, or contain them in amounts that provide less than 5 wt % $B_2O_3$ in the final glass composition. The other alkali glass formers present may include $Na_2O$ formers, and lithia formers are present in amounts between about 11 wt % and about 50 wt %, more particularly between about 28 wt % and about 50 wt % of the alkali oxide glass formers. The glass compositions have melting temperatures between about 1125° C. and about 1275° C., more particularly about 1150° C.

Example 4

High CaO Containing Waste Water Treatment Sludge from the Oak Ridge Reservation (ORR) which are Mixed (Radioactive and Hazardous) Listed Nickel Plating Line Wastes High in Organics, High in $Fe_2O_3$ and High $P_2O_5$ The Central Pollution Control Facility (CPCF) is designed to treat nonnitrate-bearing wastes from the Y-12 Plant including the Oak Ridge National Laboratory (ORNL) facilities operations at Y-12. The CPCF receives concentrated acidic or caustic wastes, and oily mopwater wastes containing beryllium, thorium, uranium, emulsified oils, commercial soaps or cleansers, and HF scrubber solution. The CPCF receives treated Waste Coolant Process Facility (WCPF) and Plating Rinsewater Treatment Facility (PRTF) wastewater effluent for final treatment and discharge with treated CPCF wastewater effluent. The process used $Ca(OH)_2$ for pH adjustment and $H_2SO_4$ and $Fe_2(SO_4)_3$ for neutralization and flocculation, respectively. The CPCF currently generates waste and was designed to process 2.7 million gallons of wastewater per year. Historically, the facility has operated at 50–75% of design capacity. This has produced approximately 41,000 gallons of 5,500 ft³ (approximately 750 55-gallon drums) of CPCF sludge waste.

There are three categories of CPCF wastes, oily, wet non-oily, and dry non-oily. The CPCF wastes are RCRA listed F006 plating line sludges containing 20–30% organics and ~0.40 wt % U-235. The CPCF wastes are also listed EPA wastes. The CPCF wastes are high in $SiO_2$, $Ca(OH)_2$, and organics. The CPCF wastes must be treated to destroy organics by either solvent extraction, wet oxidation, or incineration before the waste can be vitrified in a Joule-heated melter.

Addition of 3.09 to 7.23 wt % $Li_2O$ to the SLS glass formulations developed for the ORR CPCF waste lowered the melt temperatures ~200° C. at waste loadings of 70–80 wt %. This can be seen by comparing glasses CPCF17 and 18, CPCF30 and 24, and CPCF28 and 24 (Table IV). The use of the $Li_2O$ enabled these high waste loadings to be achieved with this refractory high SiO2 containing waste. Note that this waste and hence the glasses vitrified (see Table IV) contain significant amounts of $Fe_2O_3$ (8.31–9.54 wt %) and $P_2O_5$ (3.61–4.41) compared to the glasses formulated in Examples 1 and 2. $Fe_2O_3$ and P2O5 can also lower melt temperatures but it is obvious when comparing the compositions of the glasses paired in Table IV that at constant $Fe_2O_3$ and $P_2O_5$ it is the effect of $Li_2O$ and not the effect of the $Fe_2O_3$ or $P_2O_5$ that is the causative factor in lowering the melt temperatures.

TABLE IV

OAK RIDGE RESERVATION (ORR) CENTRAL POLLUTION CONTROL FACILITY (CPCF) GLASSES (8/95)[5]

| GLASS OXIDE | CPCF17 WT % | CPCF18 WT % | CPCF30 WT % | CPCF24 WT % | CPCF28 WT % | CPCF24 WT % |
|---|---|---|---|---|---|---|
| $Al_2O_3$ | 4.73 | 4.73 | 4.12 | 4.12 | 4.12 | 4.12 |
| $B_2O_3$ | 0.02 | 0.02 | 0.02 | 0.02 | 0.02 | 0.02 |
| CaO | 10.17 | 10.17 | 6.55 | 6.55 | 12.72 | 12.72 |
| $Cr_2O_3$ | 0.12 | 0.12 | 0.10 | 0.10 | 0.10 | 0.10 |
| $Fe_2O_3$ | 9.54 | 9.54 | 8.31 | 8.31 | 8.31 | 8.31 |
| $K_2O$ | 0.05 | 0.05 | 0.04 | 0.04 | 0.04 | 0.04 |
| $Li_2O$ | 7.23 | 0.00 | 3.09 | 0.00 | 6.17 | 0.00 |
| MgO | 0.16 | 0.16 | 0.14 | 0.14 | 0.14 | 0.14 |
| MnO | 0.02 | 0.02 | 0.02 | 0.02 | 0.02 | 0.02 |
| $Na_2O$ | 7.58 | 14.81 | 24.99 | 28.08 | 15.73 | 21.91 |
| NiO | 0.16 | 0.16 | 0.14 | 0.14 | 0.14 | 0.14 |
| $P_2O_5$ | 4.14 | 4.14 | 3.61 | 3.61 | 3.61 | 3.61 |
| PbO | 0.01 | 0.01 | 0.01 | 0.01 | 0.01 | 0.01 |
| $SiO_2$ | 55.35 | 55.35 | 48.23 | 48.23 | 48.23 | 48.23 |
| $UO_2$ | 0.60 | 0.60 | 0.52 | 0.52 | 0.52 | 0.52 |
| ZnO | 0.00 | 0.00 | 0.08 | 0.08 | 0.08 | 0.08 |
| OXIDE SUM | 99.98 | 99.98 | 99.99 | 99.99 | 99.99 | 99.99 |
| WASTE LOADING (Wt %) | 80 | 80 | 70 | 70 | 70 | 70 |
| MELT TEMP (° C.) | 1250 | 1350 | 1150 | 1350 | 1150 | 1350 |
| Passed TCLP | YES | YES | YES | YES | YES | YES |

[5]Waste glass analyses in TABLE IV are targeted not as analyzed.

The present invention has been applied to geological mine tailing residues containing significant quantities of heavy metal compounds, such as lead or barium compounds, using a barium oxide containing glass composition. These waste materials may also contain radium, uranium, or uranium daughter products (i.e., the result of fission of uranium). The mixture contains BaO formers in an amount sufficient to provide between about 4 wt % and about 7 wt % BaO in the glass composition, and either does not comprise $B_2O_3$ formers, or comprises $B_2O_3$ formers in amounts that provide less than 5 wt % $B_2O_3$ in the final glass composition. Other alkali glass formers that may be present include $Na_2O$ formers, and the lithia formers are present in amounts between about 40 wt % and about 45 wt % of said alkali oxide glass formers. The mixture may also contain lead compounds sufficient to provide about 8 wt % to about 12 wt % PbO, and iron compounds sufficient to provide about 3 wt % to about 6 wt % $Fe_2O_3$, based on the final glass composition. The resulting glass compositions have melting temperatures between about 1000° C. and about 1200° C., more particularly about 1050° C.

Example 5

High PbO, BaO, Radium Containing Geologic Mill Tailing Wastes at the Fernald Environmental Management Project (FEMP)

Vitrification is the technology that has been chosen to solidify ~18,000 tons of geologic mill tailings at the Fernald Environmental Management Project (FEMP) in Fernald, Ohio. The geologic mill tailings are residues from the processing of pitchblende ore during 1949–1958. These waste residues are contained in silos in Operable Unit 4 (OU4) at the FEMP facility. Operating Unit 4 consists of four concrete storage silos and their contents. Silos 1 and 2 contain K-65 mill tailing residues and a bentonite cap.

The K-65 residues contain radium, uranium, uranium daughter products, and heavy metals such as lead and barium. The K-65 waste leaches lead at greater than 100 times the allowable Environmental Protection Agency (EPA) Resource, Concentration, and Recovery Act (RCRA) concentration limits when tested by the Toxic Characteristic Leaching Procedure (TCLP). Vitrification is the chosen technology due to its ability to lower the release of Pb from 600 ppm from the waster to 1 ppm from the final waste glass and for its ability to contain the radium ($Ra^{226}$) and its daughter product radon ($Rn^{222}$).

Due to the high BaO content of this waste, glasses should only be formulated in the SLS system. High BaO is incompatible with borosilicate glass due to the formation of glass-in-glass phase separation which can cause the glass to be inhomogeneous and compromise the glass durability (the glass quality property of most interest when stabilizing hazardous and radioactive wastes). Previous researchers (in 1993) at the Pacific Northwest Laboratory had only been able to formulate K-65 waste glasses at high waste loadings (~85 wt %) in the SLS system at temperatures ranging between 1350–1450° C. These high temperature glasses cause volatilization of hazardous constituents in the waste, including Se and $Rn^{222}$. Melt temperatures of 1150° C. could only be achieved by the PNL researchers at waste loadings of 50 wt %, which are inadequate to give the volume reductions needed to make vitrification a cost effective solution based on waste volume reduction. Researchers at the Vitreous State Laboratory had formulated glasses at waste loadings of 60–74 wt % which melted at 1050° C. but these were borosilicate glasses prone to phase separation which performed more poorly during the EPA TCLP leach testing.

By using $Li_2O$ containing SLS glass for the FEMP K-65 waste, the melt temperature of the waste glass was lowered from 1350° C. to 1050° C. (Table V). This lower melt temperature is necessary to reduce volatilization of hazardous selenium and Rn from waste glass during processing. The $Li_2O$ containing glass is 81 wt % waste loaded compared to the 85 wt % waste glasses developed by PNL. The targeted glass composition was 85 wt % waste loaded but the analyzed composition indicated that the waste loading was more like 81 wt % waste loading. The $Li_2O$ containing glass had a durability comparable to the higher melting PNL glass (Table V) based on the Pb release during TCLP testing.

had to be melted at 1350° C. by substitution of half of the $Na_2O$ by $Li_2O$, glasses which had similar waste loadings, e.g. 70 and 72 wt %, melted at 1150° C. (Table VI). The soils did not contain significant amounts of $Fe_2O_3$. Glasses formulated with additions of both $Li_2O$ and $Fe_2O_3$ to the contaminated soil also melted at temperatures of 1150° C. This indicates that the presence of $Li_2O$ and not the $Fe_2O_3$ was main contributor to the lowering of the melt temperatures. In this case $Li_2O$ was substituted for both CaO and $SiO_2$ rather than for $Na_2O$ as in the previous examples.

TABLE V

FERNALD ENVIRONMENTAL MANAGEMENT PROJECT (FEMP) GEOLOGIC MILL TAILINGS WASTE GLASS

| GLASS OXIDE | PNL Target | PNL As Analyzed | SRTC Target | SRTC As Analyzed |
|---|---|---|---|---|
| $Al_2O_3$ | 3.20 | 3.29 | 3.14 | 4.23 |
| BaO | 5.40 | 5.61 | 5.35 | 4.95 |
| CaO | 1.30 | 1.24 | 1.27 | 1.44 |
| $Cr_2O_3$ | 0.00 | 0.00 | 0.00 | 0.14 |
| $Fe_2O_3$ | 4.10 | 4.27 | 4.08 | 4.51 |
| $K_2O$ | 0.80 | 0.80 | 0.76 | 0.73 |
| $Li_2O$ | 0.00 | 0.00 | 8.50 | 7.92 |
| MgO | 1.50 | 1.51 | 1.44 | 1.63 |
| $Na_2O$ | 15.10 | 12.51 | 10.88 | 9.85 |
| NiO | 0.70 | 0.71 | 0.00 | 0.09 |
| $P_2O_5$ |  |  | 0.68 | 0.96 |
| PbO | 10.60 | 10.95 | 10.45 | 10.30 |
| $SiO_2$ | 54.30 | 55.98 | 53.44 | 53.10 |
| Other | 3.00 | 3.5 | 0.00 | 0.00 |
| OXIDE SUM | 100.00 | 100.47 | 99.99 | 100.63 |
| WASTE LOADING (WT %) |  | 85 | 85 | 81 |
| MELT TEMP (° C.) |  | 1350 | 1050 | 1050 |
| TCLP (mg/L) for Pb |  | 0.81–1.2 |  | 1.3–1.6 |

The present invention can also be used to vitrify contaminated soils and clays. Typically, an SLS glass composition is used. The glass forming mixture contains CaO formers in an amount sufficient to provide between about 8 wt % and about 10 wt %, more particularly about 9 wt %, CaO in the glass composition, and either does not comprise $B_2O_3$ formers, or comprises $B_2O_3$ formers in amounts that provide less than 5 wt % $B_2O_3$ in the final glass composition. Other alkali glass formers comprise $Na_2O$ formers are typically used, and the lithia formers are present in amounts sufficient to provide between about 40 wt % and about 60 wt %, more particularly about 50 wt %, of lithia based on the alkali oxide glass formers. The glass composition typically has a melting temperature between about 1000° C. and about 1200° C., more particularly about 1150° C.

Example 6

Savannah River Site Contaminated Soils

Savannah River Site has many oils and clays which are contaminated with Hg, pesticides, organics, etc. The soils contain 93–95 wt % $SiO_2$ and are very refractory. The soils made into SLS glass by addition of 30 wt % $Na_2O$ and CaO

TABLE VI

SAVANNAH RIVER CONTAMINATED SOILS

| GLASS OXIDE | GLASS #8 (TR96-0418)[6] | GLASS #3 (TR95-0413)[7] |
|---|---|---|
| $Al_2O_3$ | 3.02 | 3.60 |
| $B_2O_3$ | 0.00 | 0.02 |
| BaO | 0.00 | 0.01 |
| CaO | 9.07 | 12.67 |
| $Cr_2O_3$ | 0.00 | 0.01 |
| $Fe_2O_3$ | 1.21 | 0.75 |
| $Li_2O$ | 11 | 0.00 |
| MgO | 0.01 | 0.00 |
| $Na_2O$ | 10.74 | 10.88 |
| $Nd_2O_3$ | 0.00 | 0.01 |
| NiO | 0.00 | 0.01 |
| $P_2O_5$ | 0.05 | 0.03 |
| PbO | 0.00 | 0.03 |
| $SiO_2$ | 65.19 | 70.49 |
| SrO | 0.00 | 0.00 |
| $TiO_2$ | 0.17 | 0.34 |
| $ZrO_2$ | 0.04 | 0.02 |
| OXIDE SUM | 100.00 | 98.87 |
| WASTE LOADING (Wt %) | 70 | 72 |
| MELT TEMP(° C.) | 1150 | 1350 |

[6]Waste glass composition as targeted.
[7]Waste glass composition as analyzed.

The present invention can also be applied to glass compositions used for immobilizing asbestos containing waste materials. The glass forming mixture typically contains MgO formers in an amount sufficient to provide between about 5 wt % and about 15 wt % MgO in the glass composition, either does not comprise $B_2O_3$ formers, or comprises $B_2O_3$ formers in amounts that provide less than 5 wt % $B_2O_3$ in the final glass composition, and contains other alkali glass formers such as $Na_2O$ formers. The mixture may also contain iron compounds sufficient to provide about 8 wt % to about 25 wt % $Fe_2O_3$, based on the final glass composition. The mixture contains lithia formers in amount sufficient to form between about 18 wt % and about 45 wt % lithia based on the alkali oxide glass formers. These compositions typically have a melting temperature between about 1000° C. and about 1200° C., more particularly about 1150° C.

Example 7

Asbestos Containing Material (ACM)

The safe disposal of asbestos containing materials (ACM) in the private sector, at U.S. Department of Energy (DOE) nuclear sites, and U.S. Army and Navy sites has become problematic. The ACM includes asbestos and fiberglass insulation, boiler lashing, transite, floor tiles, and asbestos covered pipe. The current disposal technique is to seal the ACM in plastic for safe transportation to a burial site. Burial of wrapped asbestos covered pipe necessitates large disposal volumes in regulated disposal sites, e.g. landfills and burial grounds. The availability of regulated disposal sites is rapidly diminishing, causing disposal to be problematic.

Prior to World War II a family of high coefficient of expansion glasses (above $50 \times 10^{-7}$) had been discovered. Many contained $B_2O_3$ in their formulation. $B_2O_3$ had been used in glass formulations prior to this time due primarily to its high cost and lack of availability. These high coefficient of expansion glasses were known as "Palex" Type Glasses. Palex was the trade name used for the borosilicate glasses manufactured in the Kavalier Glassworks at Sazava, Czechoslovakia around 1935. During World War II the composition was improved by adding alumina and CaO while decreasing the MgO content. A series of low thermal expansion (not to exceed $60 \times 10^{-7}$) Palex type glasses with no $B_2O_3$ and additional MgO to replace $B_2O_3$ was discovered by A. Riedel in Dolnf Polubny (Czechoslovakia) in 1939. These glasses (including Palex 5/13 in Table VII below) were produced commercially. The range of compositions of these glasses was given in his 1943 patent (See footnote 8 below) as a maximum of 8 wt % alkali oxides ($Na_2O+K_2O$), 5wt % $Al_2O_3$ or ZnO, and a maximum of 15 wt % MgO. This glass was used as fire-proof and heat resistant laboratory glassware. It was the forerunner of our current day PYREX laboratory glassware.

The Palex glass composition is advantageous for stabilization of ACM because most ACM material contains significant amounts of $MgCO_3$ and $CaSO_4$ used as binding materials when ACM is used to coat or insulate pipe. The Savannah River Site and many other government installations have millions of tons of asbestos covered pipe. When the asbestos, $MgCO_3$, $CaSO_4$ material is dissolved from asbestos covered pipe it can be stabilized in Palex type glass compositions rather than in SLS or borosilicate type glass compositions. However, Palex type glasses melt in excess of 1450° C. Therefore the addition of 4–7 wt % $Li_2O$ to replace $Na_2O$ and/or the $K_2O$ in the Palex glasses was used to lower the melt temperature to 1150° C. (See Table VII).

TABLE VII

ASBESTOS CONTAINING MATERIAL (ACM) GLASSES

| GLASS OXIDES | PALEX 5/13[8] | ACM GLASS[9] #4 | ACM GLASS #5 |
|---|---|---|---|
| $Al_2O_3$ | 0.00 | 0.43 | 0.22 |
| CaO | 0.00 | 0.74 | 0.37 |
| $Cr_2O_3$ | 0.00 | 0.30 | 0.15 |
| $Fe_2O_3$ | 0.00 | 19.72 | 9.86 |
| $K_2O$ | 3.50 | 0.16 | 0.08 |
| $Li_2O$ | 0.00 | 4.00 | 7.00 |
| MgO | 15.00 | 13.71 | 6.86 |
| MnO | 0.00 | 0.17 | 0.09 |
| $Na_2O$ | 3.50 | 17.48 | 8.74 |
| NiO | 0.00 | 0.13 | 0.07 |
| $P_2O_5$ | 0.00 | 0.06 | 0.03 |
| $SiO_2$ | 79.00 | 43.01 | 66.51 |
| $TiO_2$ | 0.00 | 0.06 | 0.03 |
| ZnO | 0.00 | 0.02 | 0.01 |
| OXIDE SUM | 101.00 | 100.00 | 100.00 |
| WASTE LOADING (Wt %) | N/A | 60 | 70 |
| MELT TEMP (° C.) | 1450 | 1150 | 1150 |

[8]O. Riedel, Fire-proof and Heat Resisting Glass, G.P. #737,033 (1943).
[9]ACM Glass Compositions given in TABLE VII are used as targeted.

Example 8

Pb Paint Abatement

The U.S. Army Construction Engineering Research Laboratory (USACERL) in Champaign, Ill. is developing and has patented (U.S. Pat. No. 5,292,375) a technique to thermally spray glass onto metal and wood substrates. The hot glass vaporizes the organics in the paint and complexes with the Pb in the paint. The Pb is atomically bonded in the glass. As the glass cools it thermally contracts and spalls off the flame sprayed surface. The glass can then be swept up, remelted, tested to ensure compliance with current EPA regulatory test limits, and then be disposed of in a land fill. This is far more effective than the current method of sand blasting the Pb paint off of tanks, ships, bridges, etc., and collecting the Pb paint and sand which fails the current EPA regulatory test limits and therefore needs to be stored in perpetuity.

The USACERL patented several glass compositions for their thermal spray program in U.S. Pat. No. 5,292,375. None of these contained $Li_2O$ and $Fe_2O_3$. During a Work for Others program with SRTC, glasses containing $Li_2O$ and $Fe_2O_3$ were found to have superior thermal spray properties and to atomically bond the Pb better than other glasses. These superior properties are due to the presence of $Li_2O$ and $Fe_2O_3$ as outlined in this patent.

TABLE VIII

Glasses for Thermal Vitrification Spraying of Pb Paint

| GLASS OXIDE | USACERL Glasses Patent | SRTC Initial Formulation (165 TDS Startup Frit) | SRTC Optimization Formulation[10] |
|---|---|---|---|
| $Al_2O_3$ | 0.6–4.0 | 4.3 | 5.1 |
| $B_2O_3$ | 1.3–25.0 | 7.2 | 10. |
| BaO | 2.0–10.0 | 0.00 | 0.00 |
| CaO | 0.5–5.5 | 1.4 | 0.00 |
| $Fe_2O_3$ | 0.00 | 11.3 | 12.3 |
| $Li_2O$ | 0.00 | 5.0 | 2.0 |
| MgO | 0.00 | 0.70 | 0.00 |
| $MnO_2$ | 0.00 | 2.5 | 0.00 |
| $Na_2O$ | 5.9–10.0 | 11.00 | 16.5 |
| NiO | 0.25–0.4 | 0.90 | 0.00 |
| $SiO_2$ | 35.0–69.1 | 55.0 | 54.1 |
| ZnO | 3.0–10.0 | 0.00 | 0.00 |
| $TiO_2$ | 0.5–2.0 | 0.00 | 0.00 |
| $ZrO_2$ | 0.3–3.0 | 0.70 | 0.00 |
| OXIDE SUM | N/A | 100 | 100 |
| PbO LOADING (Wt %) | 0.5–3.0 | 25.0 | 25.0 |

[10]J.C. Marra et al., Glass Composition Development for a Thermal Spray Vitrification Process, Ceramic Transactions, vol. 72, pp. 419–426 (1996).

The specific embodiments of the invention having herein been described, various modifications and variations thereof will become apparent to those of skill in the art. These modifications and variations are not intended to be excluded from the scope of the appended claims, or of equivalents thereto.

What is claimed is:

1. A method of vitrifying radioactive, hazardous, or mixed waste comprising:

(1) mixing said waste with glass formers such that the resulting mixture comprises $SiO_2$ and alkali oxide glass formers, wherein said alkali oxide glass formers comprise lithia formers and other alkali oxide glass formers in amounts such that the lithia formers, calculated as $Li_2O$, are from 10.0 wt % to about 100 wt % of the total alkali oxide glass formers, calculated as $M_2O$, where M is an alkali metal;

(2) heating the mixture to a temperature below the melting point of a corresponding mixture without said lithia formers; and (3) melting the resulting mixture at said temperature and cooling the melted mixture to form a glass composition.

2. The method according to claim 1, wherein said lithia formers are from about 11.0 wt % to about 76 wt % of the total alkali oxide glass formers.

3. The method according to claim 1, wherein
    said mixture further comprise $B_2O_3$ formers in an amount sufficient to provide 5 wt % $B_2O_3$ or more in the glass composition;
    said other alkali oxide glass formers comprise $Na_2O$;
    said lithia formers are between about 30 wt % and about 50 wt % of said alkali oxide glass formers; and
    said melting is at a temperature between about 1150° C. and about 1200° C.

4. The method according to claim 3, wherein said lithia formers are between about 35 wt % and about 50 wt % of said alkali oxide glass formers.

5. The method according to claim 4, wherein said lithia formers are between about 40 wt % and about 48 wt % of said alkali oxide glass formers.

6. The method according to claim 3, wherein said waste comprises a refractory mixture of waste water sludge and spent filter aids containing $Al_2O_3$ and $SiO_2$, and wherein said glass composition has a waste loading of about 90 wt %.

7. The method according to claim 1, wherein:
    said mixture further comprises CaO formers in an amount sufficient to provide between about 0.25 wt % and about 0.5 wt % CaO in the glass composition;
    said mixture either does not comprise $B_2O_3$ formers, or comprises $B_2O_3$ formers in amounts that provide less than 5 wt % $B_2O_3$ in the final glass composition;
    said other alkali glass formers comprise $Na_2O$;
    said lithia formers are between about 25 wt % and about 35 wt % of said alkali oxide glass formers; and
    said melting is at a temperature between about 1150° C. and about 1250° C.

8. The method according to claim 7, wherein said lithia formers are about 30 wt % of said alkali oxide glass formers.

9. The method according to claim 7, wherein said waste comprises a refractory mixture of waste water sludge and spent filter aids containing $Al_2O_3$ and $SiO_2$, and wherein said glass composition has a waste loading of about 90 wt %.

10. The method according to claim 7, wherein said melting is at a temperature of about 1200° C.

11. The method according to claim 1, wherein:
    said mixture further comprises CaO formers in an amount sufficient to provide between about 12 wt % and about 30 wt % CaO in the glass composition;
    said mixture either does not comprise $B_2O_3$ formers, or comprises $B_2O_3$ formers in amounts that provide less than 5 wt % $B_2O_3$ in the final glass composition;
    said other alkali glass formers comprise $Na_2O$;
    said lithia formers are between about 40 wt % and about 80 wt % of said alkali oxide glass formers; and
    said melting is at a temperature between about 1175° C. and about 1200° C.

12. The method according to claim 11, wherein said lithia formers are between about 42 wt % and about 75 wt % of said alkali oxide glass formers.

13. The method according to claim 12, wherein said lithia formers are between about 42 wt % and about 47 wt % of said alkali oxide glass formers.

14. The method according to claim 11, wherein said waste comprises $CaCO_3$ containing sludge resulting from treatment of nitrate containing wastes by biodenitrification, followed by neutralization with lime.

15. The method according to claim 1, wherein:
said mixture further comprises CaO formers in an amount sufficient to provide between about 15 wt % and about 22 wt % CaO in the glass composition;
said mixture either does not comprise $B_2O_3$ formers, or comprises $B_2O_3$ formers in amounts that provide less than 5 wt % $B_2O_3$ in the final glass composition;
said other alkali glass formers comprise $Na_2O$;
said lithia formers are between about 37 wt % and about 46 wt % of said alkali oxide glass formers; and
said melting is at a temperature between about 1100° C. and about 1200° C.

16. The method according to claim 15, wherein said temperature is about 1150° C.

17. The method according to claim 15, wherein said waste comprises $Ca(OH)_2$ and $SiO_2$, Ag, Ni, depleted uranium, or $Tc^{99}$.

18. The method according to claim 15, wherein said mixture further comprises iron compounds sufficient to provide about 9.0 wt % to about 13 wt % $Fe_2O_3$, based on the final glass composition.

19. The method according to claim 1, wherein:
said mixture further comprises CaO formers in an amount sufficient to provide between about 5 wt % and about 15 wt % CaO in the glass composition;
said mixture either does not comprise $B_2O_3$ formers, or comprises $B_2O_3$ formers in amounts that provide less than 5 wt % $B_2O_3$ in the final glass composition;
said other alkali glass formers comprise $Na_2O$;
said lithia formers are between about 11 wt % and about 50 wt % of said alkali oxide glass formers; and
said melting is at a temperature between about 1125° C. and about 1275° C.

20. The method according to claim 19, wherein the CaO content in the glass composition is from about 10 wt % to about 13 wt %.

21. The method according to claim 19, wherein said lithia formers are between about 28 wt % and about 50 wt % of said alkali oxide glass formers.

22. The method according to claim 19, wherein said melting temperature is about 1150° C.

23. The method according to claim 19, wherein said waste comprises concentrated acidic or caustic wastes or oily mopwater waste containing beryllium, thorium, uranium, emulsified oils, soaps, cleansers, or HF scrubber solutions.

24. The method according to claim 19, wherein said mixture further comprises iron compounds sufficient to provide about 8 wt % to about 10 wt % $Fe_2O_3$, based on the final glass composition.

25. The method according to claim 19, wherein said mixture further comprises phosphorus compounds sufficient to provide about 3 wt % to about 5 wt % $P_2O_5$, based on the final glass composition.

26. The method according to claim 1, wherein:
said mixture further comprises BaO formers in an amount sufficient to provide between about 4 wt % and about 7 wt % BaO in the glass composition;
said mixture either does not comprise $B_2O_3$ formers, or comprises $B_2O_3$ formers in amounts that provide less than 5 wt % $B_2O_3$ in the final glass composition;
said other alkali glass formers comprise $Na_2O$;
said lithia formers are between about 40 wt % and about 45 wt % of said alkali oxide glass formers; and
said melting is at a temperature between about 1000° C. and about 1200° C.

27. The method according to claim 26, wherein said melting temperature is about 1050° C.

28. The method according to claim 26, wherein said mixture further comprises lead compounds sufficient to provide about 8 wt % to about 12 wt % PbO, based on the final glass composition.

29. The method according to claim 26, wherein said mixture further comprises iron compounds sufficient to provide about 3 wt % to about 6 wt % $Fe_2O_3$, based on the final glass composition.

30. The method according to claim 26, wherein said waste comprises geologic mill tailings residues comprising radium, uranium, uranium daughter products, or heavy metals.

31. The method according to claim 1, wherein:
said mixture further comprises CaO formers in an amount sufficient to provide between about 8 wt % and about 10 wt % CaO in the glass composition;
said mixture either does not comprise $B_2O_3$ formers, or comprises $B_2O_3$ formers in amounts that provide less than 5 wt % $B_2O_3$ in the final glass composition;
said other alkali glass formers comprise $Na_2O$;
said lithia formers are between about 40 wt % and about 60 wt % of said alkali oxide glass formers; and
said melting is at a temperature between about 1000° C. and about 1200° C.

32. The method according to claim 31, wherein said lithia formers are 50 wt % of said alkali oxide glass formers.

33. The method according to claim 31, wherein said melting temperature is about 1150° C.

34. The method according to claim 31, wherein said CaO formers are present in an amount sufficient to provide about 9 wt % CaO in the glass composition.

35. The method according to claim 31, wherein said waste comprises contaminated soils or clays.

36. The method according to claim 1, wherein:
said mixture further comprises MgO formers in an amount sufficient to provide between about 5 wt % and about 15 wt % MgO in the glass composition;
said mixture either does not comprise $B_2O_3$ formers, or comprises $B_2O_3$ formers in amounts that provide less than 5 wt % $B_2O_3$ in the final glass composition;
said other alkali glass formers comprise $Na_2O$;
said lithia formers are between about 18 wt % and about 45 wt % of said alkali oxide glass formers; and
said melting is at a temperature between about 1000° C. and about 1200° C.

37. The method according to claim 36, wherein said mixture further comprises iron compounds sufficient to provide about 8 wt % to about 25 wt % $Fe_2O_3$, based on the final glass composition.

38. The method according to claim 36, wherein said melting temperature is about 1150° C.

39. The method according to claim 36, wherein said waste is asbestos containing material.

* * * * *